H. L. LITCHFIELD.
SHUTTLE THREADER.
APPLICATION FILED JUNE 6, 1911.
1,047,957.
Patented Dec. 24, 1912.
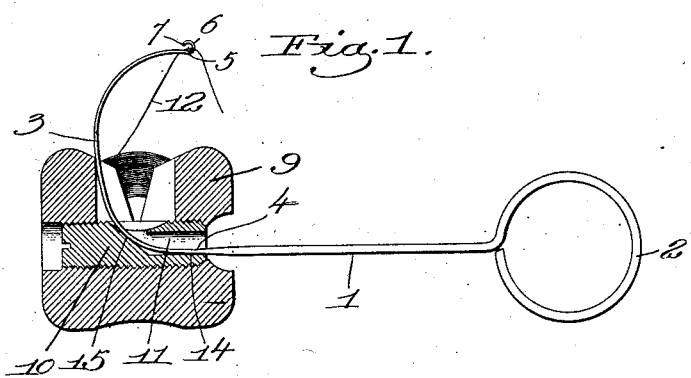
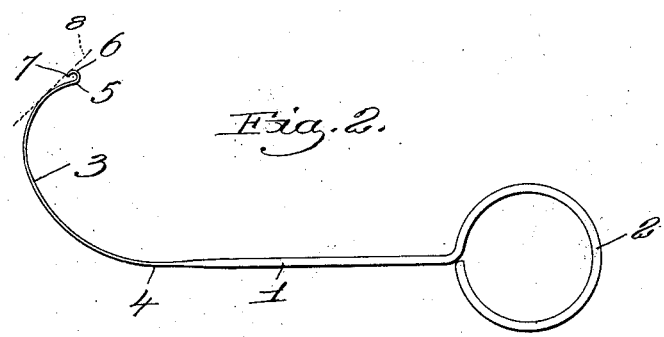
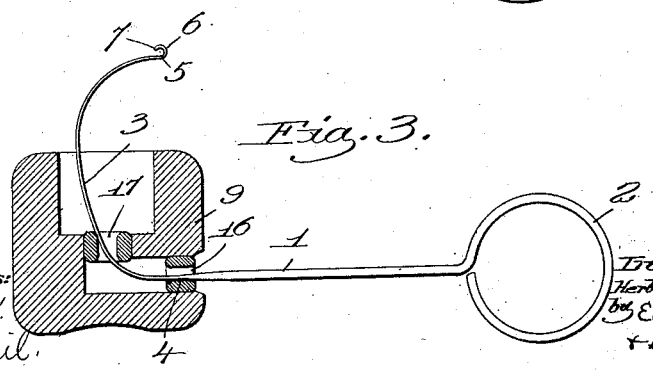

UNITED STATES PATENT OFFICE.

HERBERT L. LITCHFIELD, OF SOUTHBRIDGE, MASSACHUSETTS.

SHUTTLE-THREADER.

1,047,957. Specification of Letters Patent. Patented Dec. 24, 1912.

Application filed June 6, 1911. Serial No. 631,600.

*To all whom it may concern:*

Be it known that I, HERBERT L. LITCHFIELD, a citizen of the United States, residing at Southbridge, county of Worcester, State of Massachusetts, have invented an Improvement in Shuttle-Threaders, of which the following description, in connection with the accompanying drawing, is a specification, like characters on the drawing representing like parts.

This invention has for its object to provide a novel shuttle-threading implement by means of which the shuttle thread can be quickly drawn through the eye of any ordinary shuttle.

My improved implement is provided with a stiff shank which terminates in an extremely flexible resilient hook portion, the end of which is bent back on itself to form an open eye. The resilient hook portion can readily be inserted through the eye of a shuttle and the distance which it can be thus inserted is determined by the stiff shank, for the shank is of such a stiffness that it will not bend or flex and will not, therefore, enter the shuttle eye. The flexible hook portion is of such a length that when the implement is inserted through the shuttle eye as far as the shank will permit the open eye at the end of the hook portion stands above the shuttle at the proper point to permit the operator to readily thread the yarn into the open eye, and further the stiff shank portion serves to hold the threader in this position while the operator is threading the open eye, all as will be more fully hereinafter described and then pointed out in the appended claim.

Referring to the drawings wherein I have illustrated the preferred embodiment of my invention Figure 1 is a transverse sectional view through a shuttle showing the manner in which my threader is used; Fig. 2 is a view of the threader; Fig. 3 is a view similar to Fig. 1 showing the way in which my threader is used with another style of shuttle.

My improved shuttle threader is formed with the stiff, unyielding shank portion 1 which is preferably straight and may conveniently be provided at one end with a loop or handle 2 by which it may be manipulated, and with the resilient and flexible hook portion 3 which is adapted to enter the shuttle eye. This hook portion is to be made quite elastic so that it can be readily bent into different shapes to accommodate the shape of the shuttle eye. The flexible elastic hook portion 3 is curved throughout its length so that the curve thereof begins at the point 4 where it connects with the stiff shank 1. The tip or end of the hook portion 3 is bent inwardly slightly, as shown at 5, and then is formed into the reverse curve or hook portion 6, the tip 7 of which is spaced slightly from the portion 5 to form an open eye at the end. Further, the tip 7 is situated inside of a tangential line indicated by the dotted line 8, the purpose of which will be presently described.

In Fig. 1 I have shown my threader in use for threading a shuttle such as shown in my former Patent No. 979,865, December 27, 1910, said view showing a shuttle 9 in cross section which has a delivery eye 10 therein provided with the thread passage 11 which opens at one side of the shuttle and extends straight in from said side for a suitable distance and then curves upwardly and opens into the bobbin chamber.

In using my improved device for threading a shuttle of this nature the flexible hook portion 3 is inserted through the shuttle eye as far as the stiff shank 1 will permit, that is, until the point 4 where the elastic hook and stiff shank join enters the eye 11, as shown in Fig. 1. When the parts have reached this position the open eye 6 will be situated considerably above the shuttle and in convenient position for the thread 12 to be laid into said eye or wrapped about the end of the hook. When the thread is inserted into the eye, as shown in Fig. 1, it will be quite firmly held in such position because of the fact that the shank 1 is stiff and unyielding and when the parts reach the position shown in Fig. 1 the threader will bear against the delivery eye at the points 14 and 15 with sufficient force to prevent it from turning around in the thread passage 11 sufficiently to carry the open eye 6 out of its proper position. In fact I find with this construction that when the threader is inserted into the thread passage 4 as far as the stiff unyielding shank 1 will permit it to go, said threader will be frictionally held in the proper position shown in Fig. 1 even though the operator lets go entirely of it so that the operator can after inserting the threader, as shown, hold the shuttle in one hand and with the other wrap the yarn 12 about the hook portion 3.

I desire to emphasize the fact that the stiff shank 1 serves as a means for limiting the extent to which the threader can be forced through the shuttle eye, and also the further fact that the length of the hook portion 3 is such that when the threader has been forced into the shuttle eye as far as the stiff shank 1 thereof will permit, the open eye 6 at the end of the threader stands above the shuttle in proper position to permit the thread 12 to be laid thereinto. The shank 1, therefore, constitutes a means for insuring that the open eye 6 will always be properly positioned and will always be held in proper position while the operator is laying the thread 12 into said eye.

A shuttle having the kind of delivery eye shown in Fig. 1 is, of course, very easy to thread with my improved threader. In some shuttles the delivery eye is of the general shape shown in Fig. 3 which comprises the lateral thread passage 16 and the vertical thread passage 17. My threader can be easily used with a shuttle of this nature, for the threader can be readily inserted through the two thread passages 16 and 17 even though they stand at right angles to each other, owing to the curved hook shape of the portion 3 together with its extreme flexibility and elasticity. In a shuttle of this construction when the threader is pushed into the thread aperture as far as the stiff shank 1 will permit it to go, the friction of the device against the walls of the thread passage will firmly hold it in position to have the thread wound about the hook thereof.

The bend 5 together with the special shape of the open eye 6 is of importance because it will be noted that because of this bend and the shape of the hook the tip 7 is situated within a tangential line illustrated at 8. As a result the point or tip 7 will not readily catch against the side of the shuttle or any corner of the shuttle eye when the threader is withdrawn.

While a threading device which is flexible and elastic throughout its entire length might be used for threading a shuttle, yet the feature of having the comparatively stiff shank 1 at the end of which is the curved hook 3 made very flexible and elastic and curved through its entire length from the point 4 where it meets the shank 1 to the tip, is extremely important because by means of this special construction the threader can not only be used for threading almost any shuttle regardless of the shape of the thread passage through the shuttle eye, but when the device is inserted into the thread passage, as shown in Figs. 1 and 3 the friction thereof against the walls of the thread passage will hold the threader in proper position so that the operator can release the threader and have both hands free to hold the shuttle and wind the thread around the point 6.

Having fully described my invention, what I claim as new and desire to secure by Letters Patent is:—

A threader for shuttles having a stiff substantially unyielding shank and an extremely flexible resilient hook portion at the end of the shank which is adapted to enter the eye of a shuttle, said hook portion having an open eye at its extremity and having such a length that when the threader is inserted into the shuttle eye as far as the stiff unyielding shank will permit, said open eye of the threader is situated above the shuttle in proper position to receive the thread on the bobbin.

In testimony whereof, I have signed my name to this specification, in the presence of two subscribing witnesses.

HERBERT L. LITCHFIELD.

Witnesses:
WILLIAM G. REED,
SAMUEL S. SILVA.

---

Copies of this patent may be obtained for five cents each, by addressing the "Commissioner of Patents, Washington, D. C."